United States Patent
Alsayegh et al.

(10) Patent No.: US 12,012,332 B1
(45) Date of Patent: Jun. 18, 2024

(54) DUAL HYDROGEN AND SUSPENSION PRODUCTION SYSTEM USING EFFERVESCENT TABLETS CONTAINING HYDROGEN ACTIVE PRODUCTION METALLIC PARTICLES

(71) Applicant: KUWAIT UNIVERSITY, Safat (KW)

(72) Inventors: Naser Alsayegh, Safat (KW); Husain Bahzad, Safat (KW); Nawaf F. Aljuwayhel, Safat (KW); Ali Alsayegh, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/386,095

(22) Filed: Nov. 1, 2023

Related U.S. Application Data

(63) Continuation-in-part of application No. 18/103,117, filed on Jan. 30, 2023.

(51) Int. Cl.
*C01B 3/08* (2006.01)
*B60L 53/54* (2019.01)
(Continued)

(52) U.S. Cl.
CPC ............... *C01B 3/08* (2013.01); *B60L 53/54* (2019.02); *B60R 16/03* (2013.01); *C01B 3/0026* (2013.01);
(Continued)

(58) Field of Classification Search
CPC ......... C01B 3/08; C01B 3/0026; B60L 53/54; B60R 16/03; H01M 8/04089; H01M 8/04216; H01M 2250/10; H01M 2250/20
See application file for complete search history.

(56) References Cited

U.S. PATENT DOCUMENTS

| 3,932,600 A | 1/1976 | Gutbier et al. |
| 2003/0091503 A1 | 5/2003 | Rosenfeld et al. |

(Continued)

FOREIGN PATENT DOCUMENTS

| CN | 111646429 A | 9/2020 |
| KR | 100803076 B1 | 2/2008 |

OTHER PUBLICATIONS

DailyMed—Ohtas Isan Antacid—magnesium aluminosilicate, calcium carbonate, sodium bicarbonate tablet.

*Primary Examiner* — Daniel Berns
*Assistant Examiner* — Syed T Iqbal
(74) *Attorney, Agent, or Firm* — Nath, Goldberg & Meyer; Richard C. Litman

(57) ABSTRACT

A system and method for producing hydrogen ($H_2$) gas and a single or hybrid hydrogen active material based aqueous suspension from pre-prepared effervescent tablets are provided. The produced $H_2$ gas can be stored in a tank or directly utilized in a fuel cell, whereas the produced suspension can be employed as an advanced heat transfer fluid in a variety of thermal applications. The effervescent tablets can be fabricated with a homogeneously mixed and well-compressed mixture of hydrogen active metallic particles and effervescent powder in a sealed container to prevent air and humidity from reacting with the raw materials. As a result of the chemical reaction between the tablet and water, $H_2$ gas (in the form of bubbles) and the hydrogen active material-based suspension are produced simultaneously. This system results in two products that can be used individually or all at once by integrating the different system components together.

11 Claims, 10 Drawing Sheets

(51) Int. Cl.
*B60R 16/03* (2006.01)
*C01B 3/00* (2006.01)
*H01M 8/04082* (2016.01)
*H01M 8/04089* (2016.01)

(52) U.S. Cl.
CPC ... *H01M 8/04089* (2013.01); *H01M 8/04216* (2013.01); *H01M 2250/10* (2013.01); *H01M 2250/20* (2013.01)

(56) References Cited

U.S. PATENT DOCUMENTS

| | | |
|---|---|---|
| 2010/0028216 A1 | 2/2010 | Park |
| 2010/0173225 A1 | 7/2010 | Band et al. |
| 2011/0176973 A1* | 7/2011 | Rosenzweig ..... H01M 8/04216 220/501 |
| 2015/0360942 A1 | 12/2015 | Saluena Berna |
| 2016/0113865 A1 | 4/2016 | Kazakevitch |

* cited by examiner

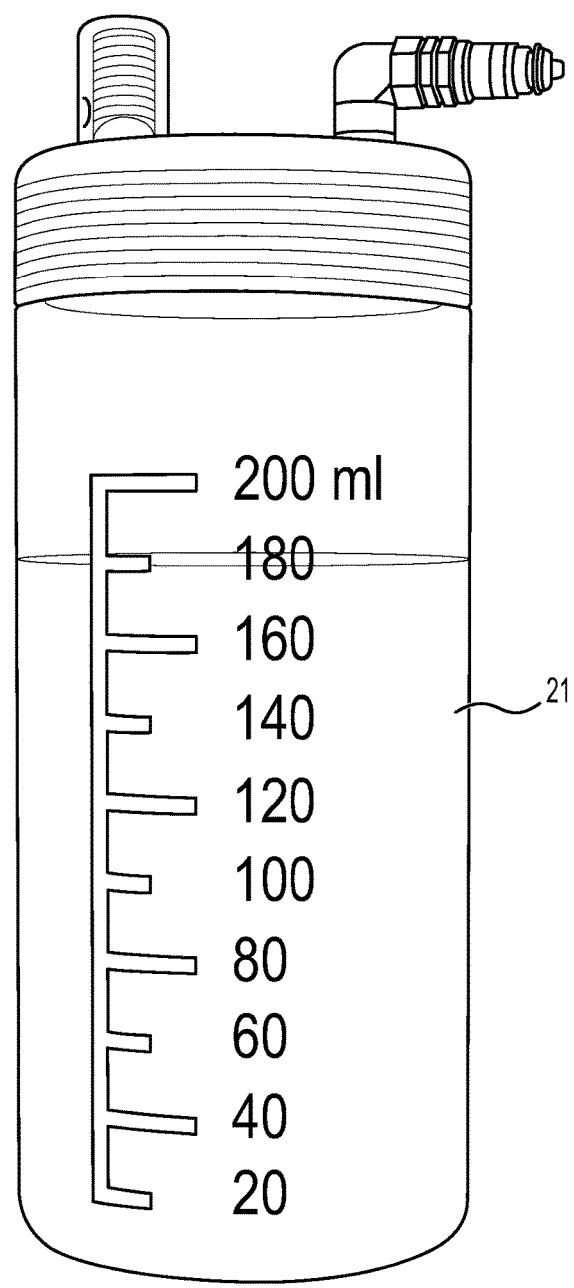 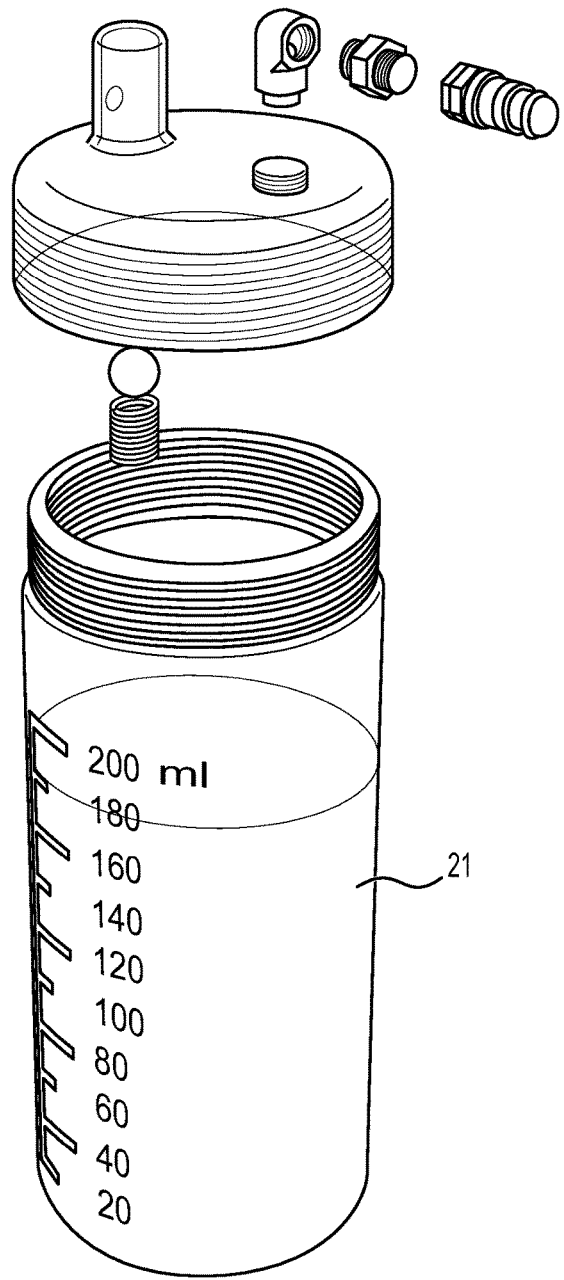
FIG. 8A    FIG. 8B

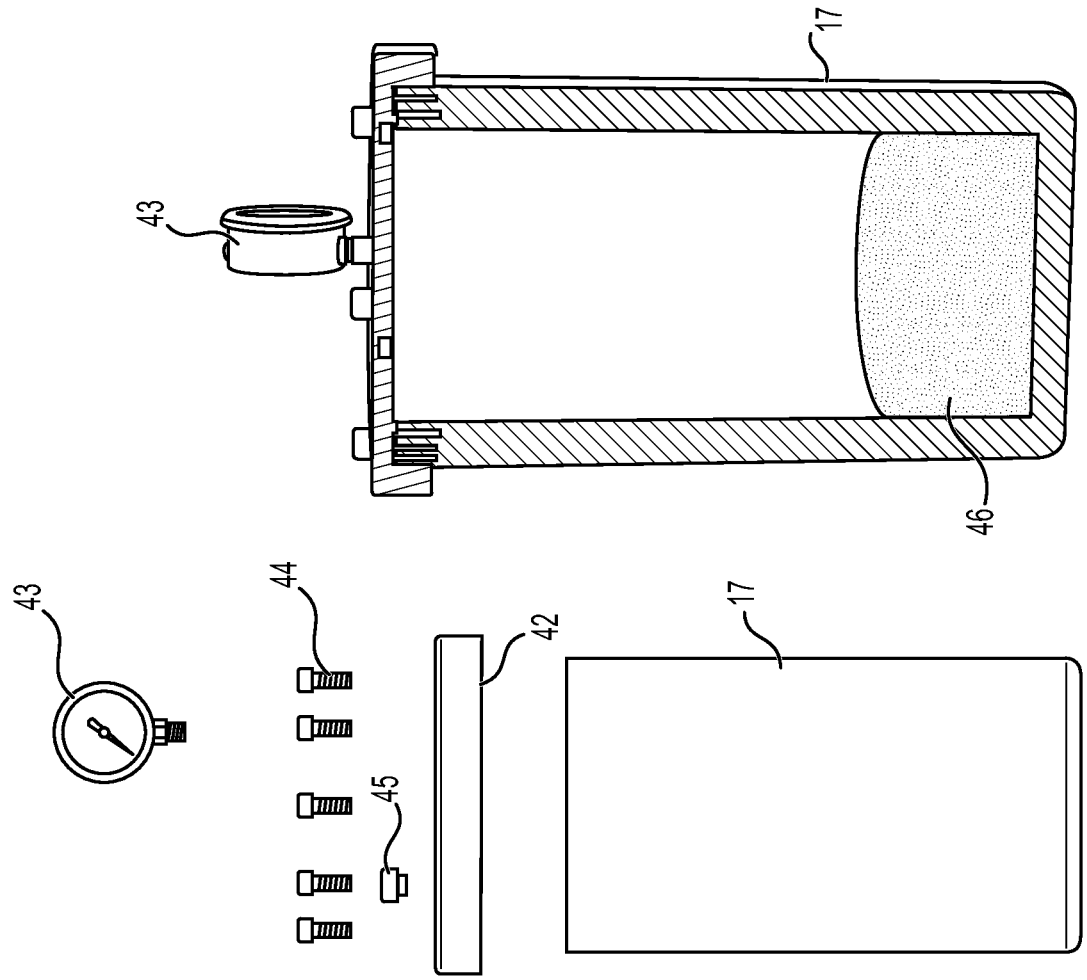
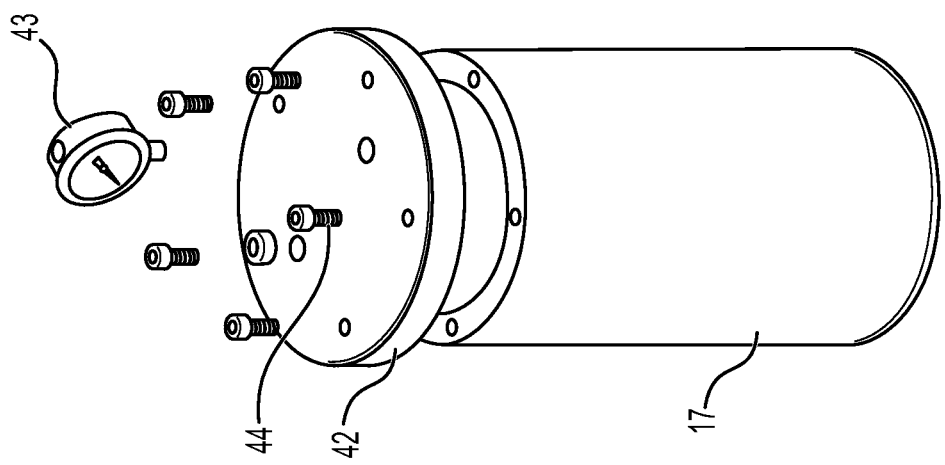
FIG. 9A  FIG. 9B  FIG. 9C

DUAL HYDROGEN AND SUSPENSION PRODUCTION SYSTEM USING EFFERVESCENT TABLETS CONTAINING HYDROGEN ACTIVE PRODUCTION METALLIC PARTICLES

CROSS REFERENCE TO RELATED APPLICATIONS

This application is a continuation-in-part (CIP) of Ser. No. 18/103,117, filed Jan. 30, 2023, now pending.

BACKGROUND

1. Field

The disclosure of the present patent application relates to the generation of hydrogen ($H_2$) gas and aqueous suspensions containing hydrogen active production particles. More specifically, it relates to producing hydrogen ($H_2$) gas and single or hybrid hydrogen active metallic particles-based aqueous suspensions from pre-prepared effervescent tablets.

2. Description of the Related Art

In recent years, researchers have focused on finding alternative sources of fuel due to increasing global demand for energy. Conventional sources of fuel, such as fossil fuel and natural gas, are depleted assets that not only face the risk of exhaustion, but their utilization causes environmental pollution. In addition, their extraction is still considered as challenging and dangerous tasks. For such reasons, major countries around the globe have been searching for alternative sources of fuels that are carbon-free as well as environmentally friendly. Hydrogen ($H_2$) is one of these fuels, where its byproduct contains only water. Hydrogen is an attractive alternative fuel because of its enormous heat of combustion (higher than that of any other material) and most environmentally friendly products (water vapor). In addition, hydrogen is the most abundant element in the universe. It can be utilized in fuel cells to generate electricity, petroleum refining, fertilizers, making ammonia with the aid of methanol, or even as rockets fuel by mixing it with oxygen ($O_2$) at the right $H_2/O_2$ ratio.

Despite being able to produce $H_2$ on a large industrial scale, the safety hazards during storage and transportation of the gas severely limit its large scale application. This is because $H_2$, in its gas form, has an explosion volume of between 4.0% to 74.2% if ignited in open air, thereby potentially causing severe damage to any surrounding and possible substantial loss of life. To minimize such safety hazards, scientists have explored mobile $H_2$ production approaches, where $H_2$ can be supplied anywhere on demand. Such approaches include the use of $H_2$ storage materials (e.g., magnesium hydride ($MgH_2$)) or chemically reacting active materials (e.g., magnesium (Mg) and aluminum (Al)) in water. However, producing the $H_2$ gas from the $H_2$ storage materials is relatively harsh as it requires a large amount of thermal energy in the form of heat. Moreover, the storage capacity of $H_2$ that can be released is limited. In theory, 1 g of $MgH_2$ can release 0.076 g of $H_2$ in its optimum conditions, and therefore it is not considered feasible for industrial use.

Further, to properly use Mg and Al to produce $H_2$ gas, the solid particles first need to be dispersed in a suspension. Therefore, additional force is required to disperse the particles, otherwise they will remain settled in the bottom of the water container. Usually, mechanical mixing equipment is used to disperse such solid particles. Such equipment may include an ultrasonicator, a homogenizer, magnetic stirring, or ball (or rod) milling devices. However, it is not practical to use such devices in remote locations due to their own need for electricity. In addition, their high capital and maintenance costs as well as complexity of use makes them an unfavorable choice.

Despite its widespread availability and obvious virtues, so-far hydrogen has not been utilized as a fuel of choice due to these technological problems which have not yet been solved satisfactorily. These problems generally relate to devising safe, efficient, and economical methods of production, storage, transport, and utilization of hydrogen in sufficient quantities to make this fuel economically feasible.

Many other methods have been described for the generation of hydrogen gas. The most common ones are electrolysis of water, gasification of coal, steam reforming of natural gas, partial oxidation of heavy oils, and the use of solar or nuclear reactor heat to break down steam into its component elements. However, these schemes for production of large quantities of hydrogen gas require major capital equipment, large production capabilities, and an input of significant amount of external energy.

Further, none of the above methods provides means for hydrogen storage, implying severe problems of storage, transportation, and safety.

Reactions of certain metals with water (e.g., alkali metals, magnesium, aluminum) may be considered as a potential source of hydrogen and energy. Aluminum may serve as a very promising candidate for such a reaction because of the high amount of hydrogen (theoretically, 1.24 liter per gram of aluminum at standard conditions), high energy produced, easy and safe handling, availability, and relatively low cost. This reaction is also desirable because the main residue (aluminum hydroxide) is environmentally benign. Aluminum is not reactive in air at ambient conditions, whereas water is readily available and easy to store. In addition, one does not have to deal with hydrogen gas at any stage prior to its in-situ production for direct use (e.g., for fuel cells, internal combustion engines, gas turbines, battery replacement, marine and underwater propulsion, etc.). Nevertheless, generally aluminum does not react with water (neither with air) in common ambient conditions due to a protective oxide (or hydroxide) layer naturally formed on the metal surface. In common applications, this "passivation" phenomenon is a fortunate property preventing corrosion, if the environment is not too acidic or alkaline. At the same time, it practically blocks the aluminum-water reaction. Hence, the execution of the reaction between aluminum and water to generate hydrogen requires activation, supposedly causing continuous disruption of the protective layer.

Numerous approaches to increase reactivity of aluminum with water are known in the art.

One approach is a mechanical treatment (cutting or friction) of the aluminum to form fresh metal surfaces which can react with water. For example, friction of metallic material under water and mechanical fracture of the oxide film accompanying the friction is disclosed in U.S. Pat. No. 7,008,609. Similarly, K. Uehara, H. Takeshita and H. Kotaka in "Hydrogen gas generation in the wet cutting of aluminum and its alloys" (Journal of Materials Processing Technology, Volume 127, 2002, Pages 174-177) studied bubbling due to hydrogen generation during reaction of fresh aluminum surfaces with water.

Activation of the reaction of fine aluminum particles with water obtained by milling aluminum in water comprising a thermal shock treatment, where aluminum fine particles were repeatedly heated and cooled down, was described in U.S. Pat. No. 7,235,226.

Continuous removal of the passivation layer on aluminum by mechanical means, in order to sustain aluminum assisted water split reaction, has been disclosed in French Patent No. 2,465,683.

U.S. Pat. Nos. 5,052,272; 5,143,047; 5,712,442; and 5,789,696 describe controlled hydrogen generators that employ aluminum and water, where disruption of the protective oxide film is achieved by fast electrical heating of the metal above its melting point.

European patent No. 0 055 134 A1 discloses a method for the production of hydrogen by inducing electrical discharge between aluminum wire and aluminum drum both of which are immersed in water. When voltage is applied between the wire and drum, arching discharge takes place, helping disruption of the oxide layer formed on the wire tip, exposing fresh aluminum to the water. Thus, a continuous generation of hydrogen gas is possible when the wire is fed against the drum. This process has two major disadvantages. First, since the process is slow, the heat generated from the reaction is wasted by being dissipated through the water. Second, it is an energy demanding process: about 10 kJ of electrical energy per 1 gram of aluminum is required to sustain the reaction.

A second approach comprises the addition of alkali hydroxide, mainly sodium hydroxide or potassium hydroxide, to the water as disclosed in U.S. Pat. Nos. 2,721,789; 6,506,360; 6,638,493; 6,800,258; 6,834,623; 7,029,778; and U.S. Published Patent Application No. 2004/0081615.

A similar approach comprises the presence of an effective amount of a catalyst in mixture with metal, wherein the catalyst is a water-soluble inorganic salt, as disclosed in U.S. Pat. Nos. 3,932,600; 3,985,865; 6,440,385; 6,582,676; and U.S. Published Patent Application No. 2005/0232837.

U.S. Pat. No. 6,582,676 presents the production of hydrogen from a water split reaction using aluminum and a ceramic, particularly calcium/magnesium oxide. Once contacted with water, these compounds cause a substantial increase of pH (i.e., create an alkaline environment), which stimulates corrosion of Al with an accompanying release of hydrogen.

Unfortunately, hydroxide chemicals cause very high alkalinity of the resulting products, making them corrosive, dangerous to handle, and potentially polluting to the environment. This increases the cost of the technology and adds safety and pollution problems. A further disadvantage is that the reaction products are not easy to handle and recycle.

Another approach comprises the use of alloys of aluminum with different metals for the reaction with water to produce hydrogen, as disclosed in U.S. Pat. Nos. 4,182,748; 4,207,095; 4,324,777; 4,358,291; 4,752,463; 5,867,978; and 6,969,417. The alloys can comprise an alkali metal, mercury, and aluminum combined with a catalytically effective amount of metals comprising one or some of: platinum, palladium, germanium, antimony, gallium, tin, etc. The alloy is typically obtained by melting the composition in an inert atmosphere. Sometimes, aluminum constitutes only a small part of the alloy mass. Because of the production of the reactive alloy by melting, it is difficult to obtain the reactive material in a powdered form which would be advantageous for fast reaction with water due to its large surface area.

Additionally, amalgamation with, or the use of, metals such as mercury; platinum; palladium; gallium; etc. results in an increase in the cost of the hydrogen to be produced. Furthermore, the use of mercury may be particularly objectionable in view of its toxicity. Additionally, the use of considerable quantities of alkali metals is disadvantageous from a process-technology point of view.

In December 2021, Rosch et al., "Formulation and Characterization of an Effervescent Hydrogen-Generating Tablet", Pharmaceuticals 2021, 14(12), 1327, showed the possibility of producing $H_2$ gas from effervescent tablets fabricated from Mg metal and ascorbic acid and Citrocoat® N. However, their approach did not take into account the thin layer formation of $Mg(OH)_2$ that prevents the full utilization of the Mg for $H_2$ production.

Previous methods used to produce suspensions typically take a one-step approach:
1—Vacuum evaporation onto a running oil substrate (VEROS),
2—Submerged arc nanoparticle synthesis system (SANSS),
3—Phase transfer approach,
4—Physical vapor condensation,
5—Laser ablation,
6—Microwave irradiation,
7—Polyol method,
8—Plasma discharge, and
9—Electrical explosion of wire.

Thus, to efficiently utilize the effervescent tablets containing the hydrogen active particles, a system and method for fully utilizing these tablets for hydrogen ($H_2$) gas and single or hybrid suspension production is desired.

SUMMARY

The presently disclosed subject matter relates to a method that produces hydrogen ($H_2$) gas and a single or hybrid hydrogen active metallic based aqueous suspension from pre-prepared effervescent tablets including hydrogen active metallic particles. The produced $H_2$ gas can be stored in a tank containing $H_2$ storage material or directly utilized in a fuel cell, whereas the as-produced suspension can be employed as an advanced heat transfer fluid in a variety of thermal applications.

In an embodiment, the effervescent tablets can be fabricated by placing a homogeneously mixed and well-compressed mixture of one or more hydrogen active metallic particles and an effervescent agent powder(/s) in a sealed glove box including helium (He) gas to prevent the raw material from reacting with air and humidity and allow the tablets to form.

After the tablets have been formed, they are placed in a specifically constructed container, then removed from the glove box. Once removed from the glove box, the container can include the newly formed tablets and the He gas. The container can then be installed in a system. A water tank in the system can then inject water towards the bottom of the tablet container, causing the bottom tablet to chemically react until it fully dissolves, after which the tablet immediately above the bottom tablet replaces the recently dissolved bottom tablet. As a result of the chemical reaction between the tablet content and water, $H_2$ gas (in the form of bubbles) and a single metallic or hybrid metallic-based suspension are produced simultaneously. The single metallic-based suspension can include a metal selected from the group consisting of magnesium (Mg), aluminum (Al), zinc (Zn), iron (Fe), nickel (Ni), tin (Sn), lead (Pb), chromium (Cr), lithium (Li), rubidium (Rb), and cesium (Cs). The hybrid metallic-based suspension can include two or more metals selected from the group consisting of magnesium (Mg), aluminum (Al), zinc (Zn), iron (Fe), nickel (Ni), tin (Sn), lead (Pb), chromium (Cr), lithium (Li), rubidium (Rb), and cesium (Cs). The integrated system is highly beneficial for industrial applications, such as providing electricity to electric or hybrid vehicles. In the case of hybrid vehicles, by way of non-limiting example, electricity can be produced from the fuel cell with the aid of the generated $H_2$ (directly produced from the tablet or stored then generated from the $H_2$ storage) and the aqueous suspension (known to have higher thermal conductivity than conventional liquids) can work as an advanced coolant to cool the vehicle combustion engine.

In one embodiment, the present subject matter relates to a method for producing hydrogen gas, the method comprising: providing a plurality of tablet compositions as described herein; vertically placing the plurality of tablet compositions in a tablet container to obtain a vertical column of the plurality of tablet compositions; and injecting water in a bottom of the tablet container causing a first bottom tablet composition in the vertical column of the plurality of the tablet compositions to chemically react with the water until it fully dissolves, thereby simultaneously producing hydrogen gas and an aqueous suspension of hydrogen active metals.

These and other features of the present subject matter will become readily apparent upon further review of the following specification.

BRIEF DESCRIPTION OF THE DRAWINGS

FIG. 8A provides a side view of a closed suspension storage container.

FIG. 8B provides an exploded view of an open suspension storage container.

FIG. 9A provides a partial plan view of a hydrogen storage container.

FIG. 9B provides a side view of a hydrogen storage container.

FIG. 9C provides a cross sectional view of a hydrogen storage container along with a palladium nanopowder therein.

Similar reference characters denote corresponding features consistently throughout the attached drawings.

DETAILED DESCRIPTION OF THE PREFERRED EMBODIMENTS

Figure 1:
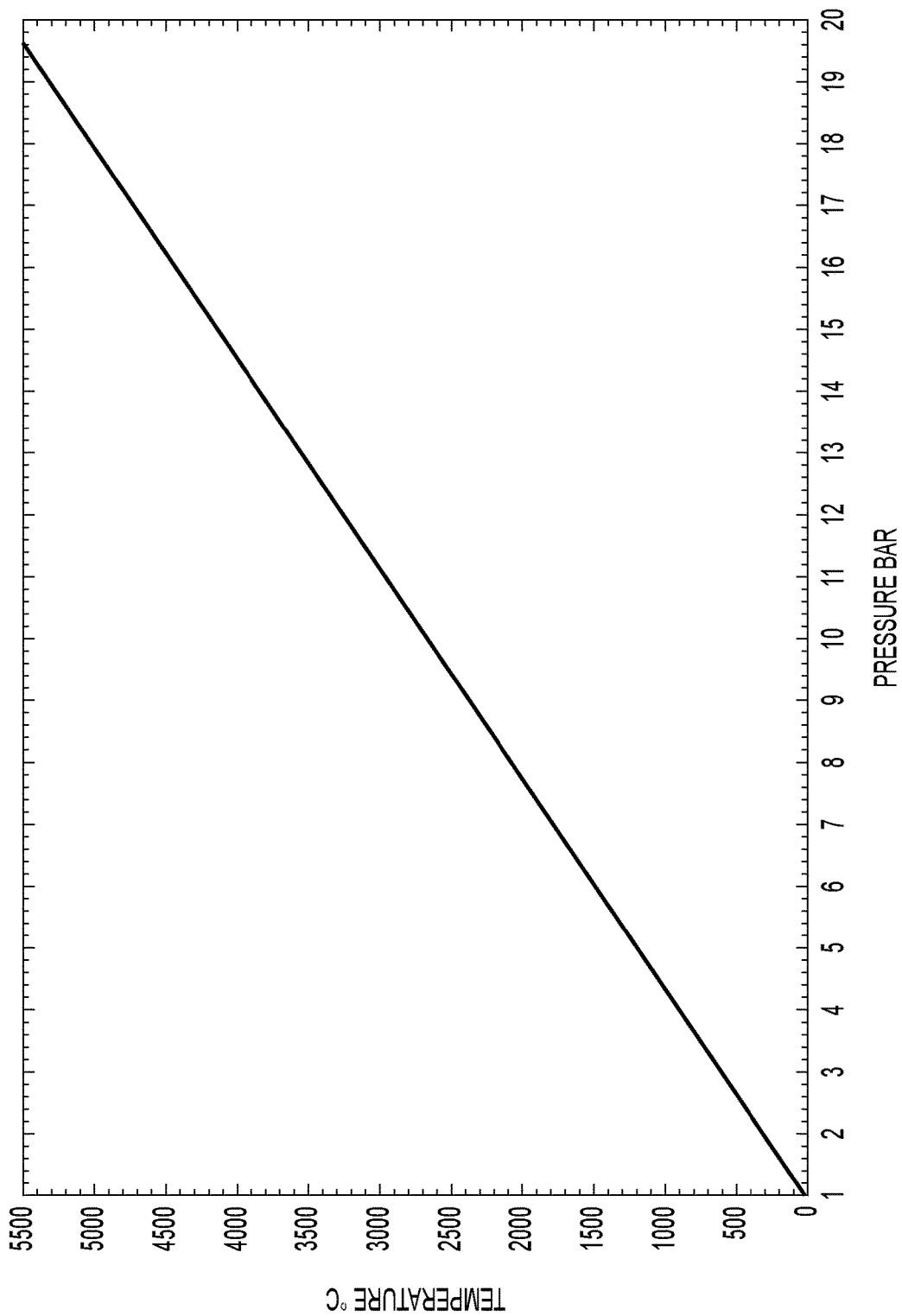
FIG. 1 is a graph (EES software output) showing the change in $H_2$ gas temperature due to compression.
Figure 2B:
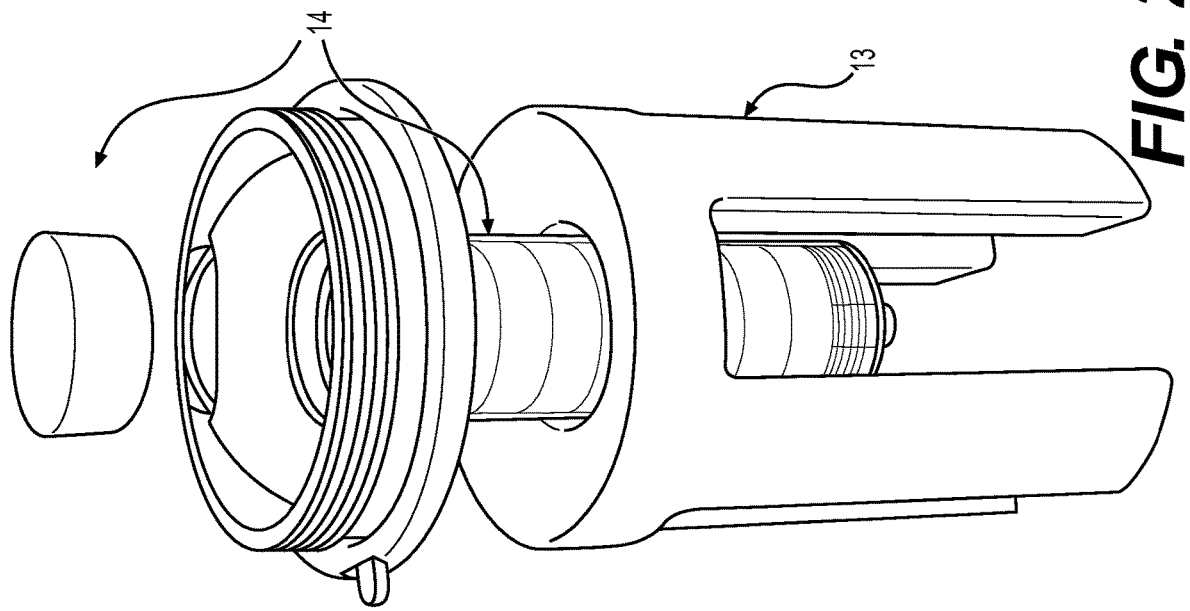
FIG. 2B shows a tablet container as placed on a holder to easily insert the tablet therein once in the glove box.
Figure 2A:
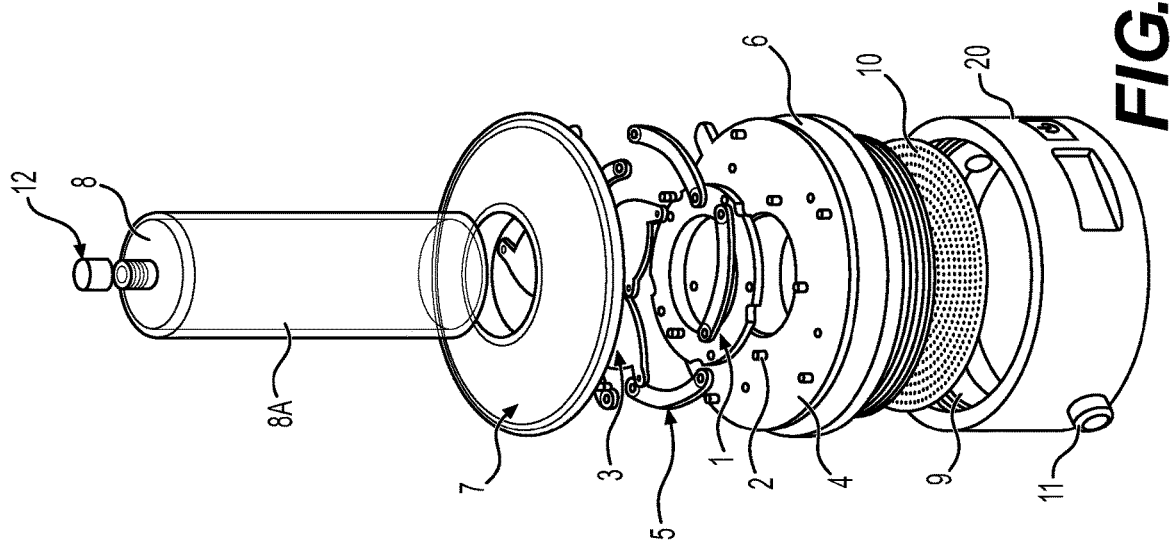
FIG. 2A shows an exploded view of a specially constructed tablet container along with a low vacuum cylindrical chamber that hosts the container.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The presently disclosed subject matter relates to a composition, system, and method that produces hydrogen ($H_2$) gas and a hybrid magnesium (Mg)-aluminum (Al) based aqueous suspension from pre-prepared effervescent tablets. The produced $H_2$ gas can be stored in a tank containing $H_2$ storage material or directly utilized in a fuel cell, whereas the as-produced aqueous suspension can be employed as an advanced heat transfer fluid in a variety of thermal applications.

In one embodiment, the as-prepared tablets, or tablet compositions, are fabricated by placing a well-compressed mixture of single or multiple hydrogen active metallic particles, and effervescent agent powder(/s) in a sealed glove box including helium (He) gas to prevent the raw material from reacting with air and humidity. The single hydrogen active metallic particles can include a metal selected from the group consisting of magnesium (Mg), aluminum (Al), zinc (Zn), iron (Fe), nickel (Ni), tin (Sn), lead (Pb), chromium (Cr), lithium (Li), rubidium (Rb), and cesium (Cs). The multiple or hybrid hydrogen active metallic particles can include two or more metals selected from the group consisting of magnesium (Mg), aluminum (Al), zinc (Zn), iron (Fe), nickel (Ni), tin (Sn), lead (Pb), chromium (Cr), lithium (Li), rubidium (Rb), and cesium (Cs). Certain embodiments of such tablet compositions comprise a homogeneus mixture of single or multiple hydrogen active metallic particles, and the effervescent agent powder(/s). The effervescent agent powder can include one or more effervescent agents selected from the group consisting of citric acid, tartaric acid, potassium bitartrate, arginine carbonate, potassium carbonate, sodium carbonate, sodium and potassium bicarbonate, and sodium citrate. In this regard, further embodiments of tablet compositions herein are effervescent tablet compositions.

After the tablets have been prepared, they can be placed, while still in the glove box with He, into a specifically constructed container, then removed from the glove box before being installed in the present systems. In one embodiment, a water tank in the system then injects water towards the bottom of the tablet container, causing the bottom tablet to chemically react until it fully dissolves, after which the tablet immediately above the bottom tablet replaces the recently dissolved tablet. As a result of the chemical reaction between the tablet content and water, $H_2$ gas (in the form of bubbles) and a single or hybrid hydrogen active metallic-based aqueous suspension can be produced simultaneously. The single metallic-based suspension can include a metal selected from the group consisting of magnesium (Mg), aluminum (Al), zinc (Zn), iron (Fe), nickel (Ni), tin (Sn), lead (Pb), chromium (Cr), lithium (Li), rubidium (Rb), and cesium (Cs). The hybrid metallic-based suspension can include two or more metals selected from the group consisting of magnesium (Mg), aluminum (Al), zinc (Zn), iron (Fe), nickel (Ni), tin (Sn), lead (Pb), chromium (Cr), lithium (Li), rubidium (Rb), cesium (Cs).

The present systems enable the two products (i.e., $H_2$ gas and the aqueous suspension) to be individually utilized or used all at once by integrating the different system components together. The integrated system can be highly beneficial for industrial applications, such as by way of non-limiting example, in hybrid vehicles, where electricity can be produced from the fuel cell with the aid of the generated $H_2$ gas (directly produced from the tablet or stored then produced from the $H_2$ gas storage) and the aqueous suspension (known to have higher thermal conductivity than conventional liquids) can work as an advanced coolant to cool the vehicle combustion engine.

In one embodiment, the present subject matter relates to a system and method of utilizing effervescent tablets formed from single or multiple hydrogen active metallic particles and an effervescent agent to produce hydrogen $H_2$ gas. In an embodiment, the tablet comprises a composition including ground hydrogen active metallic particles, and effervescent agent powders pressed together into a tablet. In an embodiment, the multiple hydrogen active metallic particles can include aluminum and magnesium. The so-produced tablets can be effervescent when combined with water. In this regard, when these tablets are combined with water, they can simultaneously produce an aqueous suspension and $H_2$ gas. The system including the effervescent tablets may be used in fuel cells to produce electricity, either directly on site or as stored for later use.

In certain embodiments, the present tablets are prepared in a sealed glove box to prevent air and humidity from reacting with the raw materials. According to these embodiments, after the tablets have been prepared, they can be placed in a specifically constructed container, then removed from the glove box before being installed in a system for further use. In one embodiment, a plurality of tablets herein are vertically aligned in a column in the specifically constructed container. In this regard, in use, a water tank in the system can inject water towards the bottom of the tablet container, causing the bottom tablet to chemically react until it fully dissolves, after which the tablet immediately above the bottom tablet replaces the recently dissolved tablet. As a result of the chemical reaction between the tablet content and water, $H_2$ gas (in the form of bubbles) and a single or multiple hydrogen active metallic particle-based aqueous suspension can be produced simultaneously.

The elemental aluminum and magnesium active materials are widely available and can easily be obtained from various solid waste sources (e.g., by way of non-limiting example, soda cans and electronic chips). These waste sources can be recycled into pure Al and Mg powders, after which they can be used as active materials for producing $H_2$ in the presence of water as described herein. The following Eq. 1 and Eq. 2 illustrate the reaction of Al and Mg in water at room temperature, respectively:

$$2Al + 6H_2O = 2Al(OH)_3 + 3H_2 \quad (1)$$

$$Mg + 2H_2O = Mg(OH)_2 + H_2 \quad (2)$$

As can be seen in Eq. 1 and 2, in one embodiment, there are three products that result from the two chemical reactions, which are $Al(OH)_3$, $Mg(OH)_2$, and $H_2$. Since $H_2$ is a gas, it will easily depart from the hosting liquid in the form of bubbles. However, the $Al(OH)_3$ and $Mg(OH)_2$ will remain in the water, in which case it can be either recovered, treated, then reused; or dispersed to form a suspension. The second option is more convenient because suspensions have proven to have tremendous heat transfer capability as working fluids, and thus would be highly beneficial for thermal applications (e.g., heat exchangers). However, to successfully produce these suspensions, the solid particles need to be dispersed, which is not the case with the byproducts resulting from Eq. 1-2. Therefore, additional force is required to disperse the particles, otherwise they will remain settled in the bottom of the water container. Usually, mechanical mixing equipment is used to disperse the solid particles. Such equipment includes an ultrasonicator, a homogenizer, magnetic stirring, and ball (or rod) milling devices. However, it is not practical to use such devices in remote locations due to their need for electricity to operate. In addition, their high capital and maintenance cost as well as complexity of use makes them an unfavorable choice.

The present pre-prepared effervescent tablets can avoid this difficulty. In an embodiment, the tablets are fabricated by homogeneously mixing and compressing Al particles, Mg particles, and sodium bicarbonate ($NaHCO_3$) powder in a sealed glove box to prevent air and humidity from reacting with the raw materials. The Al and Mg metals can be used because they are easily and readily obtainable, either directly from a supplier or as produced through recycling their existing waste. In addition, the $NaHCO_3$ can be used not only because it is an effervescent agent but also because it helps reduce the formation of a passivation layer (i.e., $Mg(OH)_2$) on the water exposed Mg surface. The following Eq. 3 illustrates the chemical reaction of $Mg(OH)_2$ in the presence of $NaHCO_3$:

$$2NaHCO_3 + Mg(OH)_2 \rightarrow Na_2CO_3 + MgCO_3 + 2H_2O \quad (3)$$

In certain embodiments, the tablet compositions herein can optionally further comprise surfactants (e.g., by way of non-limiting example, sodium dodecyl sulfate (SDS)) to increase the dispersion stability of the produced suspension. Such surfactant will not affect the chemical reaction, and therefore the $H_2$ generation will remain the same and the dispersion stability of the suspension may highly improve, as well as its effective thermal conductivity.

In some embodiments, the physical stability of the produced aqueous suspension can have a major influence on its effective thermophysical properties. This is always the case with any suspension, where the optimum thermophysical properties can only be obtained when the dispersed particles are physically stable, and vice versa. This can be improved by optionally including surfactants, such as SDS, as part of the tablet mixture at the fabrication stage as noted above.

The tablet compositions of the present subject matter have certain advantages over compositions previously known in the art. For example, the ability to produce the aqueous suspensions from tablets means devices or advanced equipment are not required to make the present aqueous suspensions. This, in turn, means the aqueous suspensions can be readily produced in remote areas. Furthermore, the user producing the $H_2$ gas and aqueous suspension will only need a minimum amount of knowledge to be able to use the present systems and methods.

Further, since the present tablet compositions make it possible to produce $H_2$ gas and aqueous suspensions from effervescent tablets, the user will not have to be worried about dealing with powders or face the high risks currently involved with $H_2$ gas transportation such as, for example, explosions. Similarly, the present tablet compositions are much less costly to produce and use when compared to current conventional $H_2$ gas production routes, particularly when taking into account the salary of the experts that will be working on any scientific devices/equipment needed to produce the $H_2$ gas and aqueous suspensions, and the cost of the equipment used. In addition, the cost of the raw materials used to produce the present tablet compositions is extremely cheap, and such materials are widely available, representing a significant benefit over any presently known products. Since the user will not need additional mixing instruments, this method is more feasible to any interested users in $H_2$ gas and Al—Mg-based suspensions. As a result, the system can be used in labs, facilities, fields, and on hybrid vehicles.

In other embodiments, the tablet compositions can be stored in sealed bags or in specially constructed tablet containers for the user to use whenever desired. Accordingly, the present subject matter describes the first tablet-based integrated Al—Mg-based suspension fabrication and $H_2$ production, storage, and utilization approach. This results in a ready to use commercial product for producing $H_2$ gas and Al—Mg-based suspensions.

In one embodiment, the present subject matter relates to a process for the generation of hydrogen gas with tablets such as, for example, effervescent tablets. In certain embodiments, the present subject matter includes using ground single or multiple hydrogen active metal powders, and effervescent agent powder(/s) pressed together into a tablet that can be effervescent when combined with water. These tablets can be combined with water to simultaneously produce a water suspension and $H_2$ gas.

In another embodiment, the present subject matter relates to an innovative system for producing or generating hydrogen ($H_2$) and a single (or hybrid) hydrogen active metallic-based aqueous suspension from pre-prepared effervescent tablets. The produced $H_2$ gas can be stored in a tank containing $H_2$ storage material or directly utilized in a fuel cell, whereas the as-produced suspension can be employed as an advanced heat transfer fluid in a variety of thermal applications.

Using the system as described herein, the two products (i.e., $H_2$ and aqueous suspension) can be individually utilized or used all at once by integrating the different system components together. The integrated system is highly beneficial for industrial applications, such as by way of non-limiting example hybrid vehicles, where electricity can be produced from the fuel cell with the aid of the generated $H_2$ (directly produced from the tablet or stored then generated from the $H_2$ storage) and the suspension (known to have higher thermal conductivity than conventional liquids) can work as an advanced coolant to cool the vehicle combustion engine.

Figure 3:
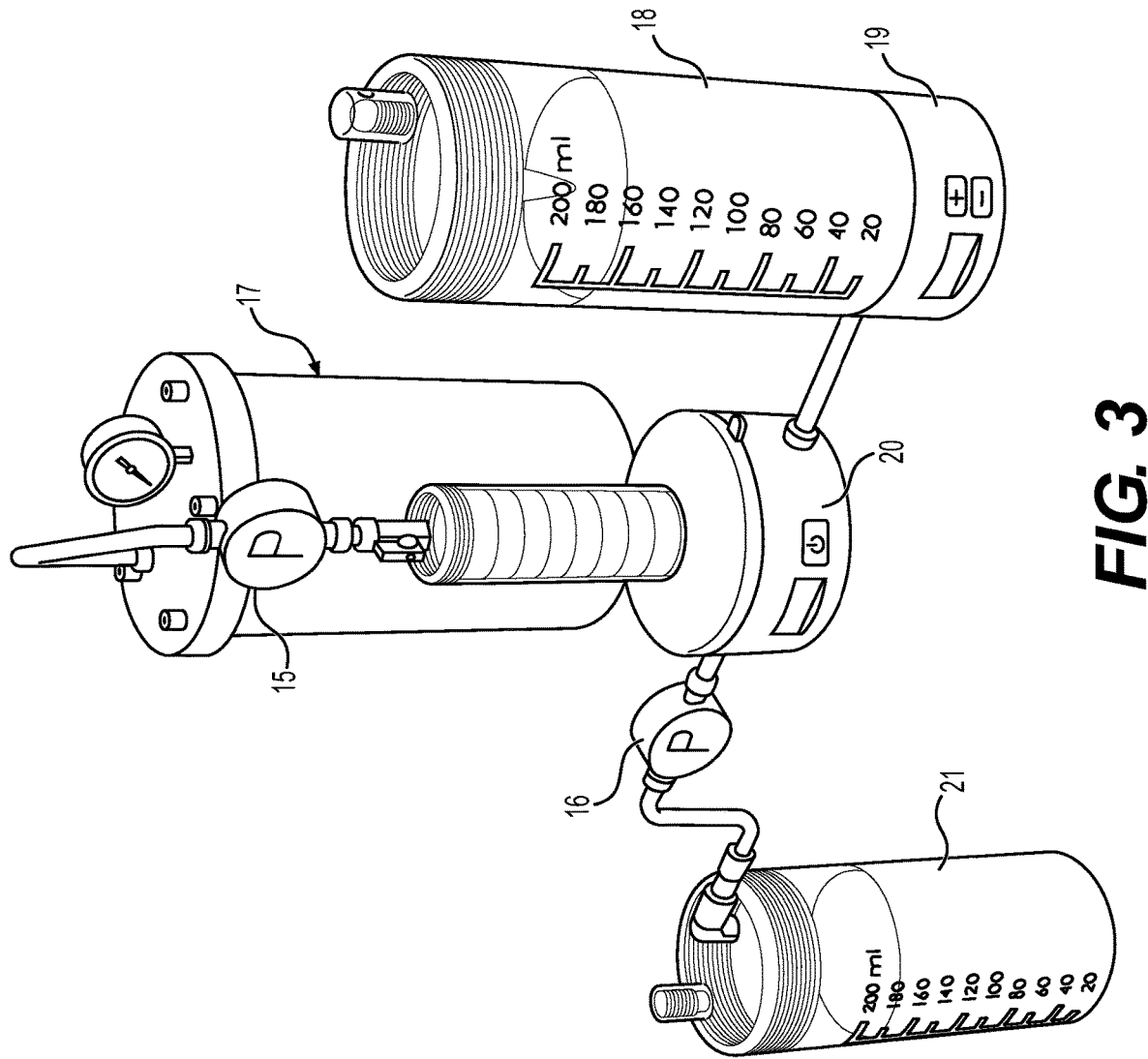
FIG. 3 shows a proposed Configuration 1 for generation of the aqueous suspension product and $H_2$ gas.

In certain embodiments, and by way of non-limiting example, three configurations are exemplified for the present systems, namely:

1—Configuration 1: for suspension production, and $H_2$ generation and storage (FIG. 3).

Figure 4:
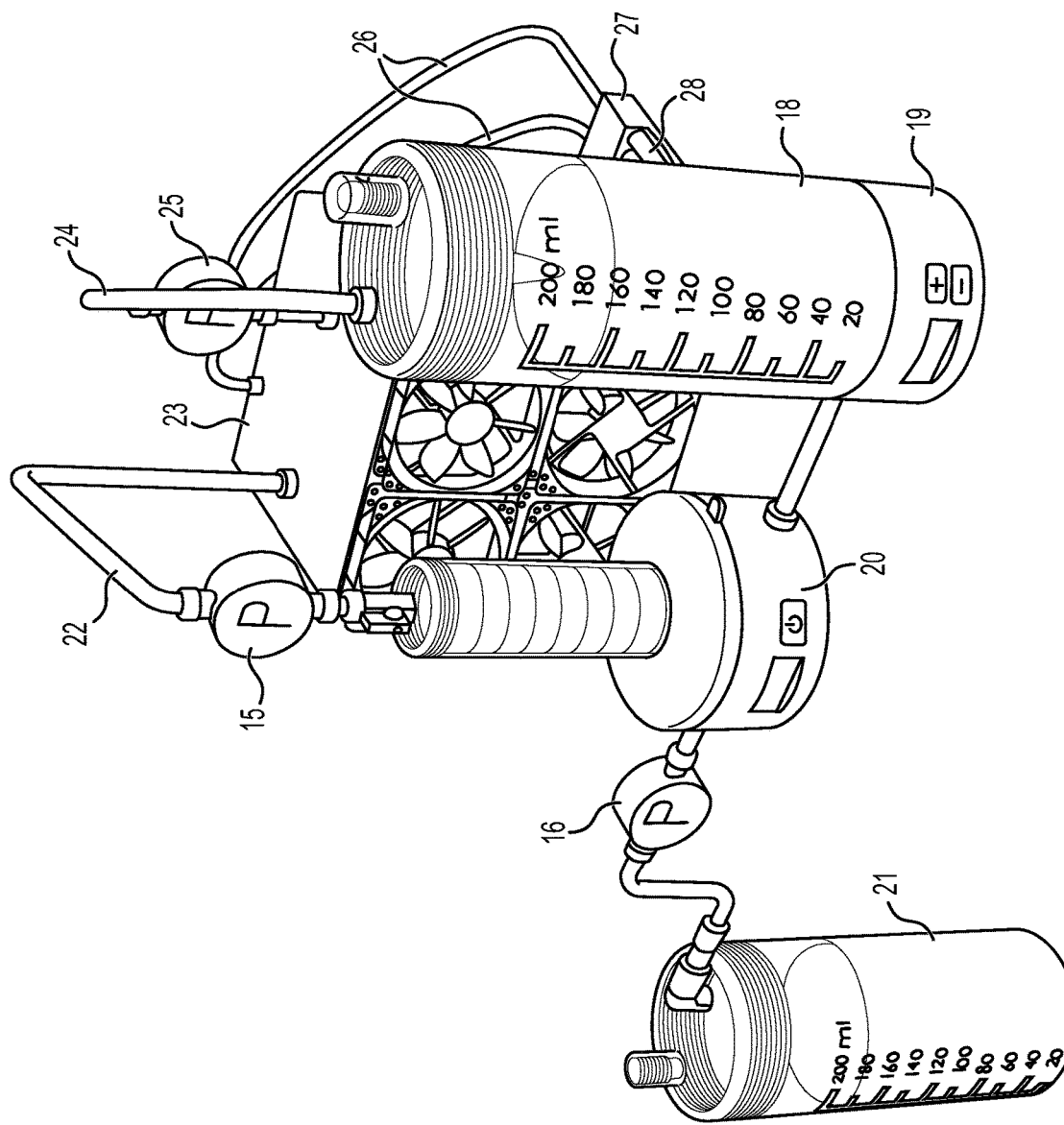
FIG. 4 shows a proposed Configuration 2 for generation of the aqueous suspension product and $H_2$ gas, followed by direct utilization thereof.

2—Configuration 2: for suspension production, and $H_2$ generation and direct utilization (FIG. 4).

Figure 5:
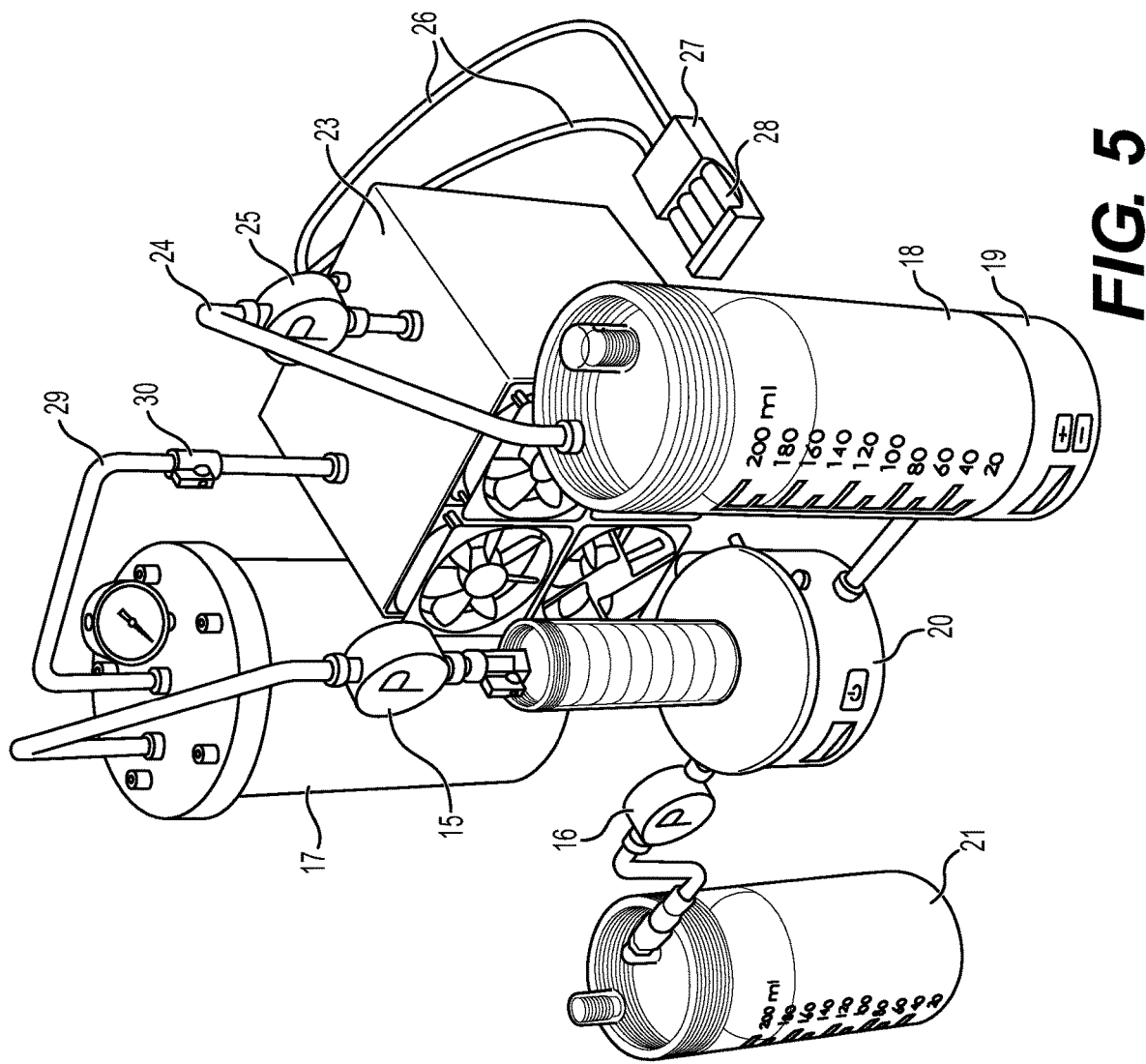
FIG. 5 shows a proposed Configuration 3 for generation of the aqueous suspension product and $H_2$ gas, followed by direct utilization thereof.

3—Configuration 3: for suspension production, and $H_2$ generation, storage, then utilization (FIG. 5).

For configuration 1, as shown in FIG. 3, water tank 18 is connected to vacuum chamber 20. Vacuum chamber 20 is used to eject any possible air content, and thus prevent air from contacting the tablets (i.e., the chamber containing the effervescent tablets will only contain He gas and the tablets). Liquid pump 19 is used for transporting water out of water tank 18 into vacuum chamber 20 for contacting with the tablet compositions. Any $H_2$ gas generated is stored in $H_2$ storage tank 17, where it is conveyed via gas pump 15. Similarly, the aqueous suspension produced is stored in suspension tank 21, where it is conveyed via liquid pump 16.

For configuration 2, as shown in FIG. 4, water tank 18 is connected to vacuum chamber 20. Vacuum chamber 20 is used to eject any possible air content, thus preventing air from contacting the tablets (i.e., the chamber containing the effervescent tablets will only contain He gas and the tablets). Liquid pump 19 is used for transporting water out of water tank 18 into vacuum chamber 20 for contacting with the tablet compositions. Gas pump 15 is used to transport the generated $H_2$ gas through the $H_2$ inlet 22 and into fuel cell 23. Inlet 22 is wrapped with a heating jacket to increase the $H_2$ temperature to the required fuel cell operation temperature. Alternatively, inlet 22 can be connected to a chamber so that the $H_2$ gas can be compressed, then released into fuel cell 23. The compression process will cause the released gas temperature to significantly increase above its initial temperature (i.e., 25° C.) as shown in FIG. 1, (generated using Engineering Equation Solver (EES) commercial software, version V11.633 for $H_2$ gas). Water produced in fuel cell 23 can flow through water outlet 24 via the water pump 25 back into water tank 18 for reuse in the process. The aqueous suspension is stored in suspension tank 21, where it is conveyed via liquid pump 16. Wires 26 connect the fuel cell 23 to charging station 27 having batteries 28 therein.

For configuration 3, as shown in FIG. 5, water tank 18 is connected to vacuum chamber 20. Vacuum chamber 20 is used to eject any possible air content, thus preventing air from contacting the tablets (i.e., the chamber containing the effervescent tablets will only contain He gas and the tablets). Liquid pump 19 is used for transporting water out of water tank 18 into vacuum chamber 20 for contacting with the tablet compositions. Any $H_2$ gas generated is stored in $H_2$ storage tank 17, where it is conveyed via gas pump 15. When the $H_2$ gas for ready for use, it will flow from $H_2$ storage tank 17 through $H_2$ outlet 29 and via valve 30 into fuel cell 23. Outlet 29 is wrapped with a heating jacket to increase the $H_2$ temperature to the required fuel cell operation temperature. Alternatively, the pressure in storage tank 17 can be increased so that the released $H_2$ gas to fuel cell 23 can meet its operational temperature. Water produced in fuel cell 23 can flow through water outlet 24 via the water pump 25 back into water tank 18 for reuse in the process. The aqueous suspension produced is stored in suspension tank 21, where it is conveyed via liquid pump 16. Wires 26 connect the fuel cell 23 to charging station 27 having batteries 28 therein.

For all three configurations, water is pumped from the water container 18 (FIGS. 6A-C) to the low vacuum cylindrical chamber 9 containing the tablets. The temperature of the water can be controlled before it is pumped by wrapping the water container 18 with a heating cooling jacket. With the aid of the mesh 10 placed below the tablet and on the upper part of the vacuum container (FIG. 7B), the water will only touch the bottom part of the tablet. This will cause the chemical reaction between the tablet and the water to start, and thus produce the suspension and generate the $H_2$ gas. The suspension is then pumped and stored in the suspension container 21 (FIGS. 8A-8B). However, depending on the system set-up (i.e., configuration 1, or 2), the $H_2$ gas will either be stored in $H_2$ storage materials 46 (by way of non-limiting example, palladium nanopowder), as shown in FIG. 9C, or directly utilized in a fuel cell to produce electricity. It is important to note that after each tablet is fully dissolved as a result of the chemical reaction, another tablet (i.e., the above tablet) will take its place until all the tablets in the container are fully consumed. In addition, when utilizing $H_2$ in a fuel cell, the output is both electricity and water. This water can be redirected into the water container 21 to partially compensate for the water losses from the process.

In the case of configuration 3, as shown in FIG. 5, the fuel cell is directly connected to the $H_2$ storage tank 17. Therefore, to utilize the $H_2$, a heating element (or a hot plate as well as a heating jacket) can be added to the $H_2$ storage tank to increase the temperature of the $H_2$ storage material, thus releasing the $H_2$ gas from the tank towards the fuel cell, at the required operation temperature, for electricity production. In addition, an extra heating jacket can be wrapped on inlet 29 to further increase the $H_2$ temperature to the required fuel cell operation temperature. Furthermore, if the users want to increase the dispersion stability of the produced suspension, they can include surfactants (e.g., sodium dodecyl sulfate (SDS)) as part of the effervescent tablets content at the tablet fabrication stage. Such surfactant will not affect the chemical reaction, and therefore the $H_2$ generation will remain the same and the dispersion stability of the suspension will highly improve as well as its effective thermal conductivity.

Figure 6C:
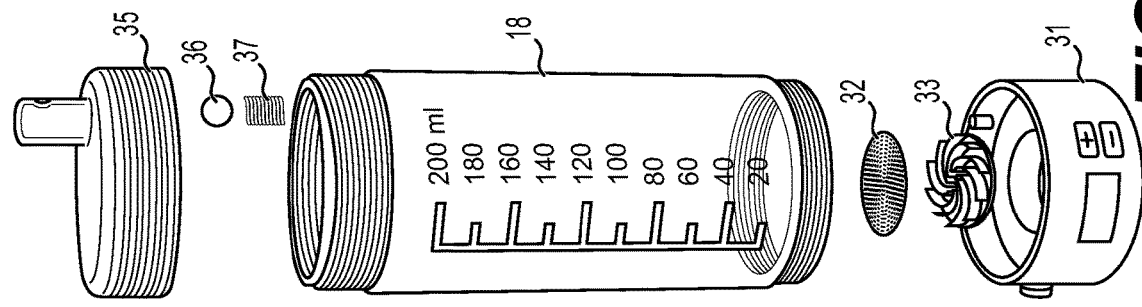
FIG. 6C provides a perspective view of a water container used in the system, where the bottom part is a liquid pump and a small metal ball and spring are visible under a vial cap at the top.
Figure 6B:
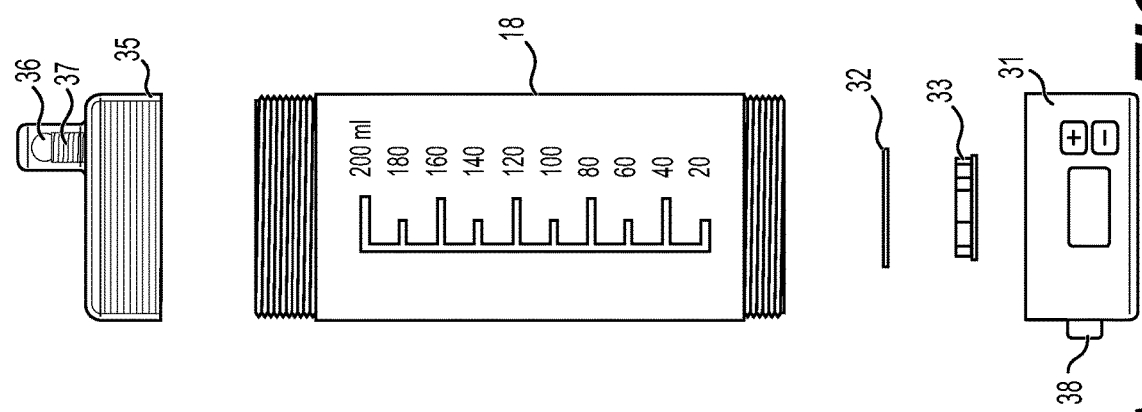
FIG. 6B provides a side view of a water container used in the system, where the bottom part is a liquid pump that includes a mesh.
Figure 6A:
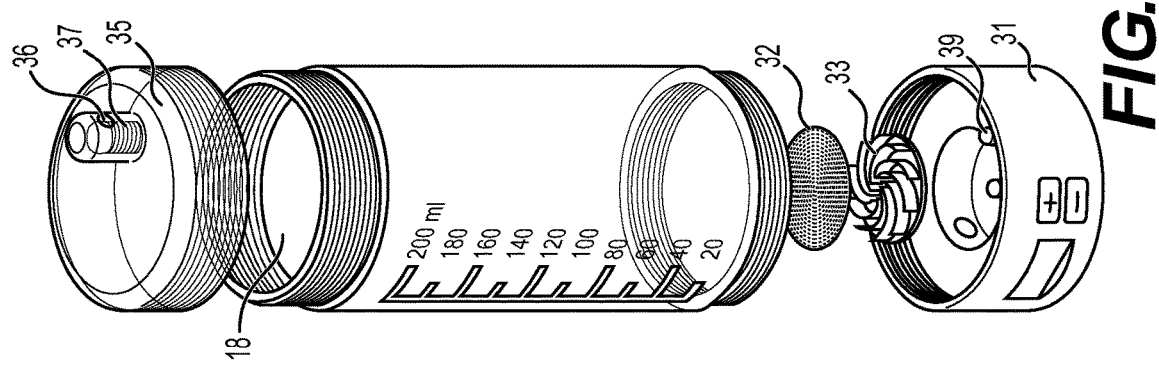
FIG. 6A provides a perspective view of a water container used in the system, where the bottom part is a liquid pump, and a thermocouple is visible in the bottom part.
Figure 7B:
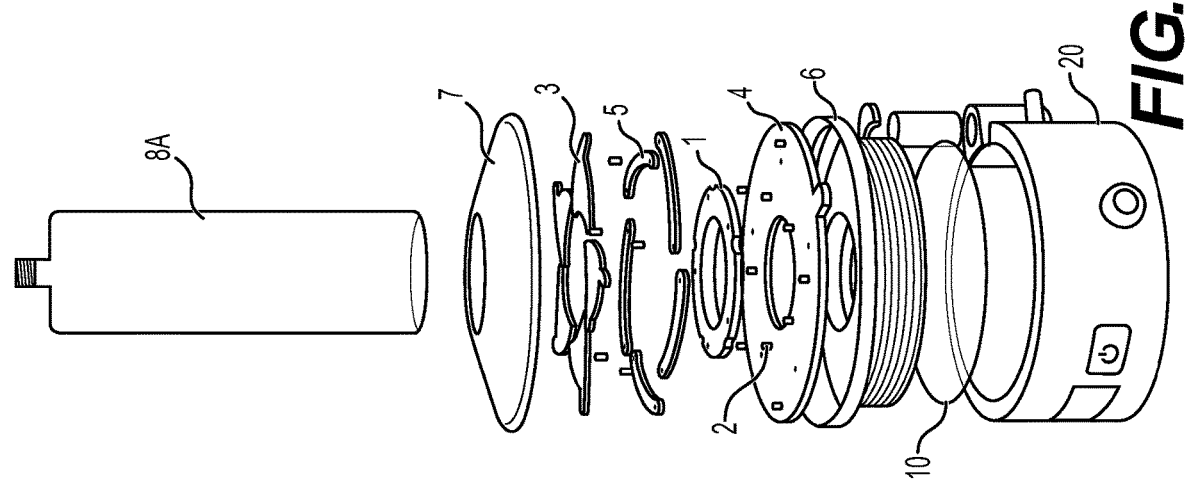
FIG. 7B provides an exploded/expanded view of FIG. 7A.
Figure 7A:
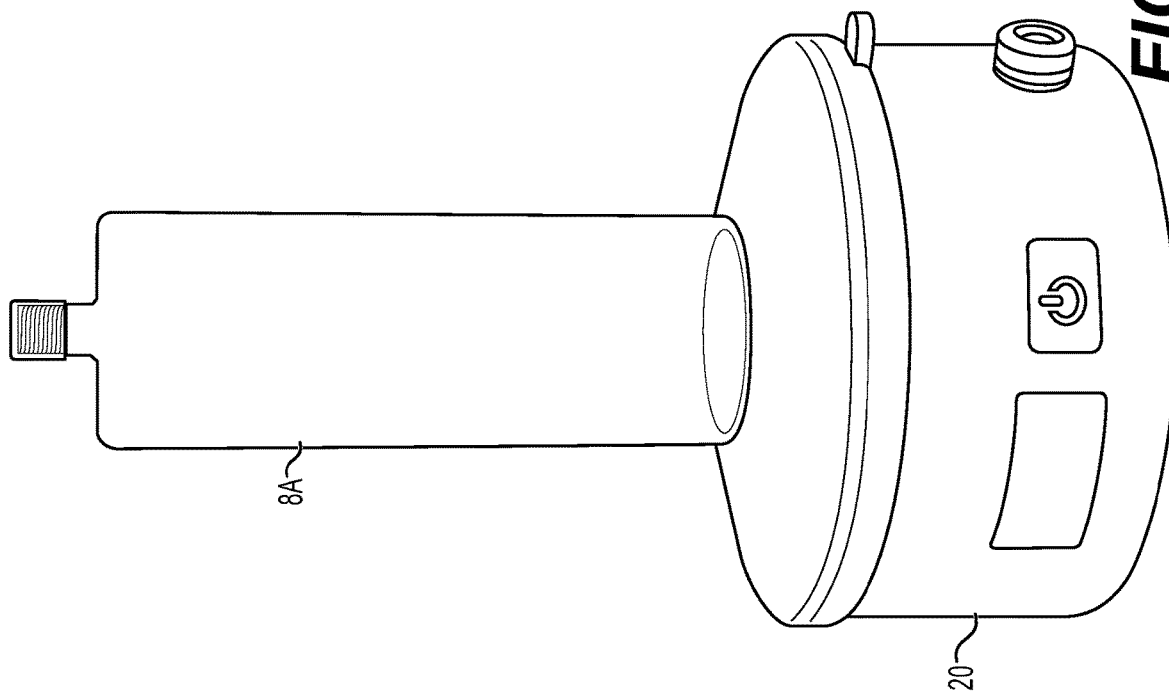
FIG. 7A provides a perspective view of a specially designed tablet container attached to a low vacuum cylindrical chamber.
Figure 7C:
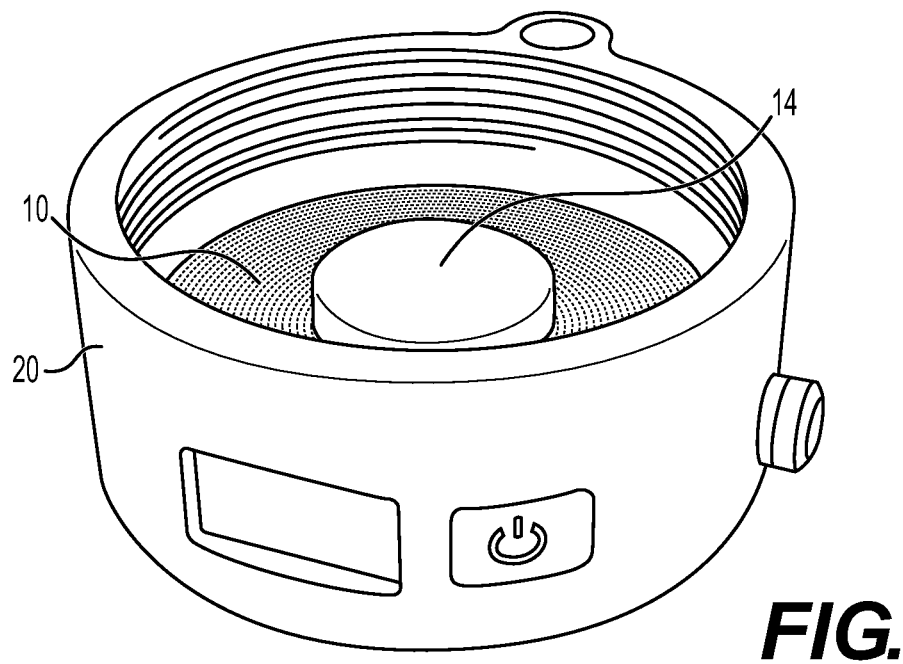
FIG. 7C provides a perspective view of the bottom tablet container portion of FIGS. 7A and 7B containing a tablet.
Figure 7D:
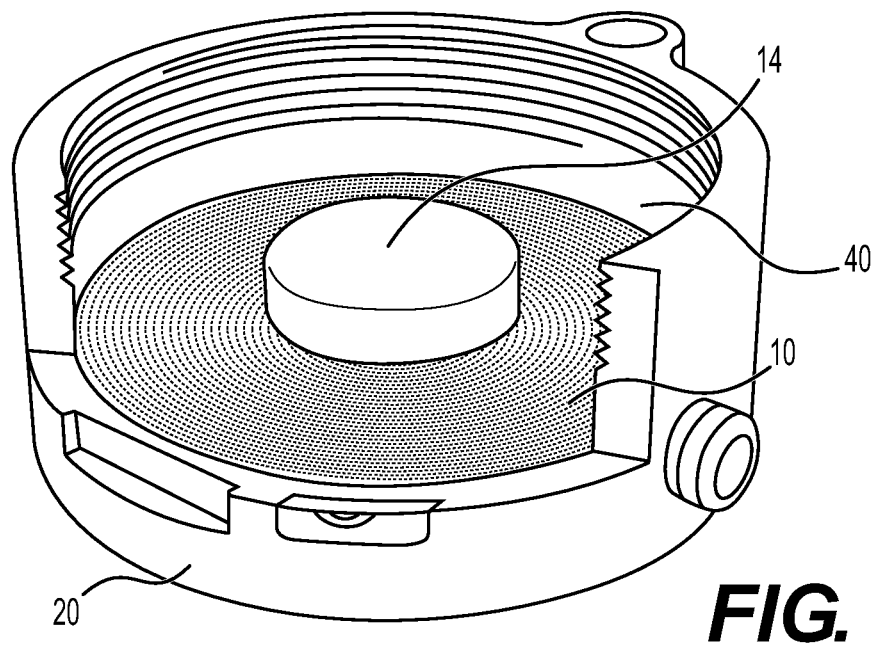
FIG. 7D provides a cutaway version of FIG. 7C depicting the tablet container portion of FIGS. 7A and 7B.

Referring to FIG. 6A, water container 18 can be mounted on pump housing 31 having thermocouple 39. Fan 33 and protective mesh 32 for liquid pump 19 are included within pump housing 31. At the top of water container 18 is vial cap 35 having a metal ball 36 and spring 37 configuration thereon, as shown in FIG. 6C. As shown in FIG. 6B, housing 31 can also include a fitting 38.

Referring to FIG. 9A, $H_2$ storage tank 17 can have $H_2$ tank cap 42 affixed to the top thereon. $H_2$ tank cap 42 can include screws 44 and pressure gauge 43. As shown in FIG. 9B, screws 44 can connect to $H_2$ tank cap 42 via fittings 45. In this example, $H_2$ storage materials 46 (by way of non-limiting example, palladium nanopowder), are included within $H_2$ storage tank 17.

In one embodiment, the system can be utilized by integrating Configuration 2 or Configuration 3 in hybrid vehicles. According to each configuration when used with such a hybrid vehicle, the produced suspension will be pumped from its container towards, for example, a vehicle radiator tank that is partially filled with water (whenever needed) to enhance the coolant thermal performance with the aid of the dispersed metallic particles. Moreover, with Configuration 2, the electrical output from the fuel cell can fulfill the electrical demand of the hybrid vehicle. In contrast, in Configuration 3, the generated heat from the vehicle combustion engine will provide the required thermal energy to release the $H_2$ from the $H_2$ storage material, which is afterwards utilized by the fuel cell for electricity supply for the vehicle.

In another embodiment, the present system can be used in conjunction with electrical charging units for electrical vehicles, especially in remote areas where electrical grids are not accessible.

In some embodiments the systems herein have been adapted for a device requiring a hydrogen source. In some embodiments the device is a hydrogen fuel cell. In some embodiments the device is an internal combustion engine. In some embodiments the device is a gas turbine. In some embodiments the hydrogen is used for power generation. In some embodiments the power generation is accomplished via hydrogen fuel cell. In some embodiments the device is used for power (electricity) generation. In some embodiments the power generation is used in underwater vehicles. In some embodiments the power generation is used in aeronautical (flying) vehicles. In some embodiments the power generation is used in automotive vehicles. In some embodiments the power generation is used in robots. In some embodiments the power generation is used in electricity generators. In some embodiments the power generation is used as battery replacement for electronic devices. In some embodiments the system further comprising means for utilizing heat generated by said system. In some embodiments the composition serves as energy and hydrogen storage.

It is to be understood that the systems methods as described herein are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for producing hydrogen gas, the method comprising:
    providing a plurality of tablet compositions, each tablet composition comprising hydrogen active metallic particles and an effervescent agent pressed together to form the tablet composition, the hydrogen active metallic particles comprising one or more hydrogen active metallic particles including a metal selected from the group consisting of magnesium (Mg), aluminum (Al), zinc (Zn), iron (Fe), nickel (Ni), tin (Sn), lead (Pb), chromium (Cr), lithium (Li), rubidium (Rb), and cesium (Cs) or hybrid hydrogen active metallic particles;
    vertically placing the plurality of the tablet compositions in a tablet container to obtain a vertical column of the plurality of the tablet compositions; and
    injecting water in a bottom of the tablet container causing a first bottom tablet composition in the vertical column of the plurality of the tablet compositions to chemically react with the water until it fully dissolves, thereby simultaneously producing hydrogen gas and an aqueous suspension of single or hybrid metal particles.

2. The method as recited in claim 1, further comprising pumping the aqueous suspension in a suspension container, where the aqueous suspension is stored.

3. The method as recited in claim 1, wherein the hydrogen gas is used in a fuel cell to produce electricity and water.

4. The method as recited in claim 3, wherein the produced water is injected into the bottom of the tablet container.

5. The method as recited in claim 1, wherein the hydrogen gas is stored in a palladium nanopowder hydrogen storage material.

6. The method as recited in claim 1, wherein after the first bottom tablet composition fully dissolves, a tablet composition immediately above the first bottom tablet composition in the vertical column slides down to become a second bottom tablet composition which is in turn chemically reacted with the water until it fully dissolves, thereby simultaneously producing hydrogen gas and an aqueous suspension of single or hybrid metal particles.

7. The method as recited in claim 6, wherein the method continues until all of the plurality of tablet compositions are fully dissolved.

8. The method as recited in claim 1, wherein the aqueous suspension is used as a coolant in a vehicle.

9. The method as recited in claim 3, wherein the fuel cell is used to produce electricity in a vehicle.

10. The method as recited in claim 3, wherein the fuel cell is used to produce electricity in an electrical charging unit for an electrical vehicle.

11. The method as recited in claim 1, wherein the aqueous solution comprises aluminum and magnesium.

* * * * *